United States Patent [19]

Schnell

[11] 4,031,592
[45] June 28, 1977

[54] DEVICE FOR CLOSING ELASTIC PACKAGES, PARTICULARLY FLEXIBLE TUBULAR CASINGS

[76] Inventor: Karl Schnell, Muhlstrasse 28, 7065 Winterbach, Germany

[22] Filed: May 20, 1975

[21] Appl. No.: 579,140

[30] Foreign Application Priority Data

May 22, 1974 Germany .......................... 2424979

[52] U.S. Cl. ..................................... 17/33; 140/82
[51] Int. Cl.² ........................................ A22C 11/00
[58] Field of Search .................. 17/34, 33, 1 F, 35, 17/36; 53/138 A, 138 R; 140/82; 29/243.56

[56] References Cited

UNITED STATES PATENTS

| | | | |
|---|---|---|---|
| 2,823,502 | 2/1958 | Rambold | 53/138 A |
| 3,383,746 | 5/1968 | Narduzzi et al. | 53/138 A |
| 3,389,533 | 6/1968 | Tipper et al. | 53/138 A |
| 3,626,994 | 12/1971 | Klenz | 140/82 |
| 3,748,690 | 7/1973 | Niedecker | 17/33 |
| 3,805,329 | 4/1974 | Kollross | 17/33 |

FOREIGN PATENTS OR APPLICATIONS 965,313  6/1957  Germany .......................... 140/82

*Primary Examiner*—Robert Peshock
*Attorney, Agent, or Firm*—McGlew and Tuttle

[57] ABSTRACT

The device is intended more particularly for closing sausage casings to separate individual sausages of a sausage strand, using clamps or clamping ties of strip material or wire. The closing device is connected to a manufacturing device for making clamps from a substantially continuous length of clamping material. The manufacturing device includes a cutting device, a feeder for feeding the length of clamp material intermittently to the cutting device for severing into individual clamping ties, a bending device operable to bend each clamping tie to provide a pair of substantially parallel legs, a clamping tie closing device operable to wrap each clamping tie around the tubular casing, and a guide operable to supply the bent clamps from the bending device to the closing device.

12 Claims, 4 Drawing Figures

DEVICE FOR CLOSING ELASTIC PACKAGES, PARTICULARLY FLEXIBLE TUBULAR CASINGS

FIELD AND BACKGROUND OF THE INVENTION

The present invention relates to a device for closing packages, formed of elastic material, particularly flexible tubular casings, by means of clamps or ties. Such devices are known per se, and they are used mainly for closing sausage casings and separating individual sausages of a sausage strand. The clips or clamps are filled into a magazine wherefrom, at the proper time, they are removed one after the other. The filling of the magazine is relatively expensive. Automatically filling magazines, known per se, are not only expensive to manufacture but also can be filled only with finished clamps made in advance. Thus, in both cases, a device for manufacturing clamps is necessary.

SUMMARY OF THE INVENTION

The present invention is directed to a device of the kind mentioned above, requiring neither the operation of filling, into a magazine, clamps manufactured in advance, nor an automatic filling mechanism for such a magazine.

In accordance with the invention, a closing device is connected to a manufacturing device for making clamps or clamping ties out of a strip or wire material. Thus, the clamps are manufactured in the machine itself and are immediately further "processed" and it is only necessary to provide a continuous length of strip or wire material, for example, a wire roll permitting manufacturing of a great number of clamps. A magazine for finished clamps as well as a mechanism for filling such a magazine becomes dispensable. No additional expenditures are incurred with the present invention since the prior art also requires a manufacturing device for making clamps.

In a particularly preferred embodiment of the invention, a cutting and bending device for the clamps is provided following a feed mechanism for the material out of which the clamps are to be made. The feed mechanism advances the material, in particular, intermittently, into the cutting device where there are separated sections having a length corresponding to the rolled-out length of the clamp. In the bending device, the straight strip or wire section is shaped into a clamp which is then clinched about the elastic casing at the desired location to close the same. For this purpose, the clamp is engaged over the casing which, for example, is folded together or gathered up, and the legs of the clamp are then bent against each other. In the closed state, the legs of the clamp may also be juxtaposed or superposed.

According to a further feature of the invention, the cutting device comprises a limit stop for the free end of the material as well as a cutting tool, particularly a rotary one, which is mounted at a distance from the limit stop corresponding to the length of the material section to be separated. The cutting tool cuts or shears sections off the free end of the strip or wire and the sections are then shaped to clamps. As soon as the finished clamp is removed from the zone of advance of the strip or wire, the feed mechanism is actuated again and the cutting device separates a further section, etc.

In a development of the invention, the material portion to be separated is supported on an anvil or the like and held in a preferably tubular guide, the anvil being provided at the one side and the guide at the other side of the point of separation. The cutting tool is displaceable or rotatable and, of course, must have enough space for this motion. The cross-section, particularly the diameter, of the tubular guide is adapted to the cross-section or diameter of the material so that, during the separation of the section, the wire end cannot turn aside.

In accordance with another feature of the invention, the anvil forms a part of the bending device and the length and shape of its supporting surface corresponds approximately to the length and shape of the mid portion of the clamp. A bending tool for the clamp legs is movable post both sides of the anvil. Upon cutting off the material, the free ends of the section are bent down by means of the bending tools. The shape and length of the mid portion of the clamp is determined by the size and shape of the anvil in the zone of its supporting surface. As long as the bending tools move in parallel planes, parallel clamp legs are formed. The length of the clamp legs depends on how far the two end portions project beyond the supporting surface of the anvil. Consequently, the legs are not necessarily of equal length.

An object of the invention is to provide an improved device for closing packages, such as flexible tubular casings, formed of elastic material, by means of clamps or ties.

Another object of the invention is to provide such a device which does not require either the operation of filling previously manufactured clamps into a magazine or an automatic filling mechanism for such a magazine.

A further object of the invention is to provide such a device which is simple and inexpensive to manufacture and reliable in operation.

For an understanding of the principles of the invention, reference is made to the following description of a typical embodiment thereof as illustrated in the accompanying drawings.

DESCRIPTION OF THE PREFERRED EMBODIMENT

Figure 2:
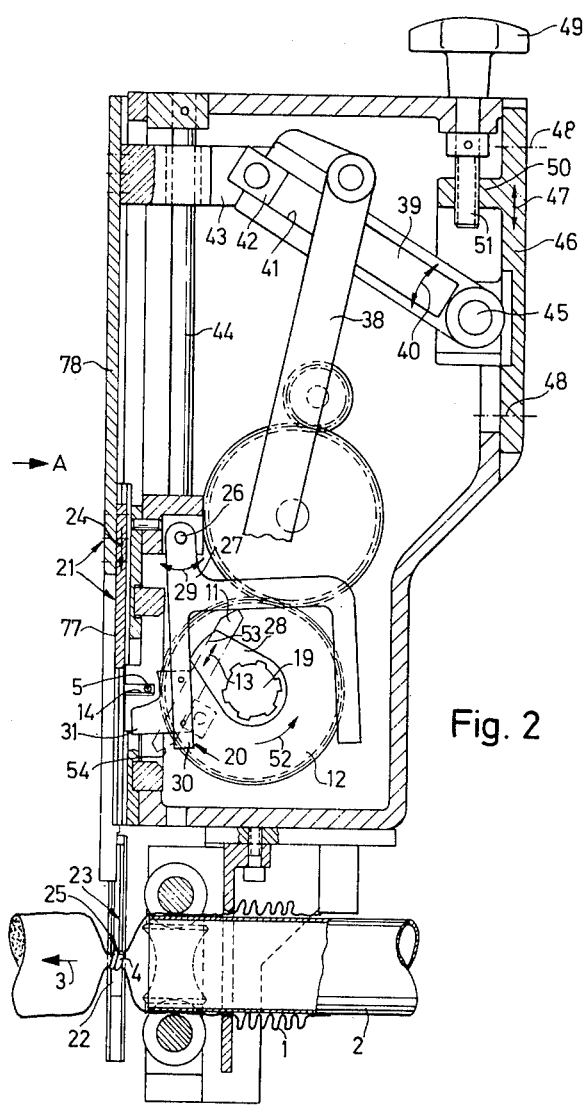
FIG. 2 is a sectional view taken along the line II—II of FIG. 1.

In the example shown, the inventive closing device for elastic casings serves to close flexible tubular casings filled with pasty masses, in particular sausage casings. The tubular casing of elastic material, in gathered-up state, is slipped over the filling tube 2 (FIG. 2) of a sausage machine (not shown). The filled casing leaves the filling tube in the direction of arrow 3. At a predetermined distance, the filled casing is squeezed by means of appropriate tools, as shown in FIG. 2. At this location, one or a plurality of clamps, for example, two clamps spaced from each other, may be attached to close the tubular casing and permit a separation of the individual sausages which are then sealed at each end by a clamp. Thus, aside from the closing, the inventive devices also makes it possible to divide a filled elastic casing into individual sections.

In accordance with the invention, this closing device is connected to a manufacturing device for making clamps 4 out of a substantially continuous length of strip or wire material 5. The material is received on a supply roll (not shown) wherefrom it is supplied to a feed mechanism 6 feeding it to a cutting device 7 and bending device 8 for clamps 4. Cutting device 7 comprises a preferably adjustable limit stop 9 for the free end 10 of the wire, as well as a rotary cutting tool 11, mounted at a distance corresponding to the length of the material section needed for making the clamp.

As shown particularly in FIG. 2, cutting tool 11 comprises a turning knife or the like which is inserted into a dovetail groove conformable to the cross-section of the knife and provided in a drive gear 12. The knife is displaceable in the direction of arrow 13 and is adjustable. For resharpening, it can be removed in a simple manner.

The material portion to be cut off, thus the starting material for the clamp to be manufactured, is supported on an anvil 14. The supporting surface may be plane or may be vaulted. Considered in the longitudinal direction of the material section, the width of clamp 4 is determined by the length of the anvil. The anvil is replaceable so that clamps of various widths and shapes may be manufactured. Both U-shaped and arcuate or similarly bent clamps can be made. During the separation, which is comparable to a shearing, the free end of the material is supported, at the one side, on anvil 14 and, at the other side, in a tubular guide 15 having an inside diameter, at least at the outlet end, corresponding to the cross-section of the wire or strip used for making the clamps. This tubular guide again is replaceable to permit using of different materials. In addition, as will be explained hereinafter, the distance of the tubular guide from the anvil 14 or from limit stop 9 can be varied. It is possible to move both stop 9 and tubular guide 15 simultaneously and uniformly away from or toward the anvil or to change the distances individually. This makes it possible to manufacture clamps with legs having unequal lengths. The point of separation or shearing plane is located, in FIG. 3, between the left end of anvil 14 and the right end of tubular guide 15.

At opposite sides of anvil 14, respective bending tools 16 and 17 of bending device 8 are provided. The bending tools comprise parallel bending levers which are secured to a splined shaft 19 and spaced from each other by a distance 18 corresponding approximately to the overall span of the clamp legs. Preferably, distance 18 is adjustable. By means of an ejecting mechanism 20, clamps 4 can be brought from bending device 8 into a clamp guide 23 extending up to clamp closing device 21, 22. The clamp closing device comprises a driver 21 which is engageable in the direction of arrow 24 and is disengageable in the opposite direction as well as a deflector member 22 which is movable into or out of position in a direction perpendicular to the drawing plane.

Figure 4:
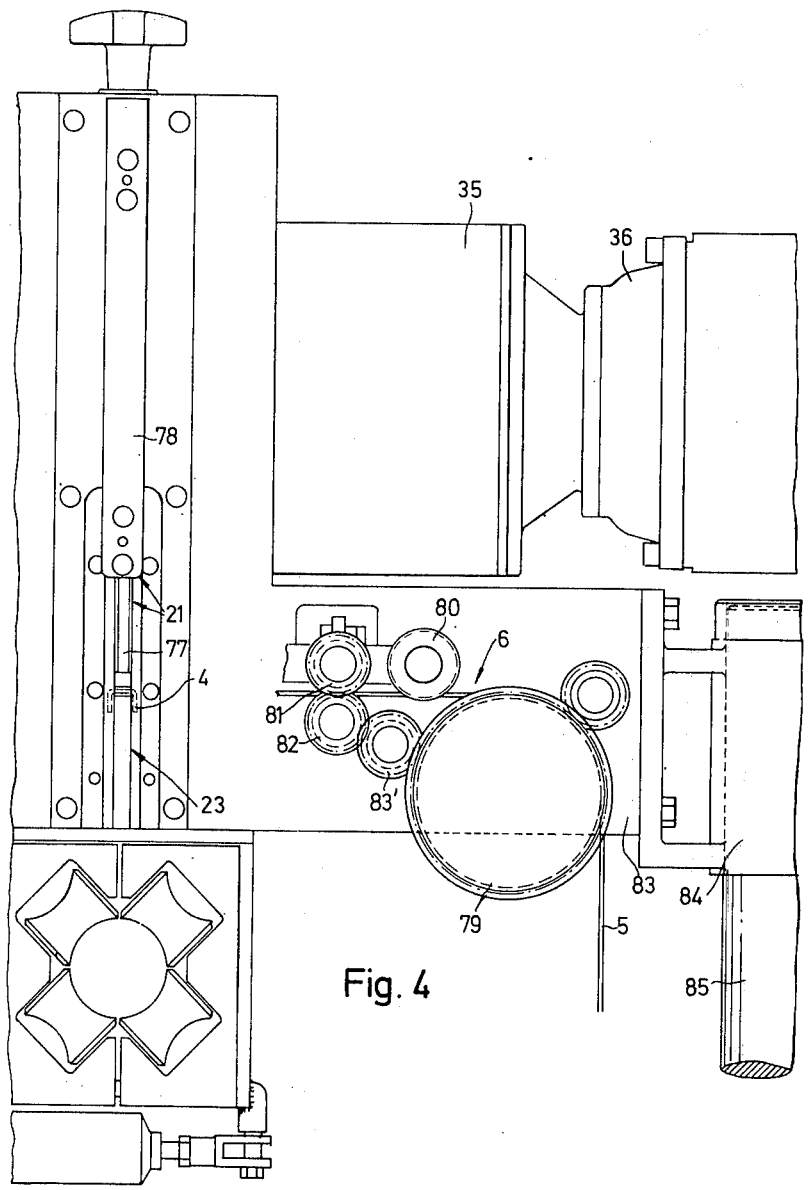
FIG. 4 is a front view in the direction of arrow A indicated in FIG. 2.

FIG. 4 shows that the free legs of the clamp 4 to be engaged project in the direction of engagement 24. As soon as the legs are engaged over the necked-down portion 25 of the elastic casing, they are forced to butt against deflector member 22 so that they are bent against each other in opposite, laterally offset directions. At the end of the closing operation, as shown in FIG. 2, the clamp takes the shape of a spiral encircling the necked-down portion. It is easily possible, however, to design the closing device for the clamps so as to obtain a ring with the free ends of the clamp legs aligned or abutting each other.

Ejecting mechanism 20 comprises an ejector 27 which is mounted for pivotal movement about a pivot 26. In the present example, ejector 27 is h-shaped and is adapted to execute an oscillatory motion in the direction of double arrow 29 under the action of a cam 28 which is carried on splined shaft 19 and secured against rotation thereon. As is evident from FIGS. 1 and 3, cam 28 serves at the same time as a spacer for the two bending tools 16 and 17. By using a more or less wide cam, or also by interposing spacer discs between the lateral surfaces of the cam and the associated bending tools, the spacing of the clamp legs can be varied in a simple manner.

Figure 3:
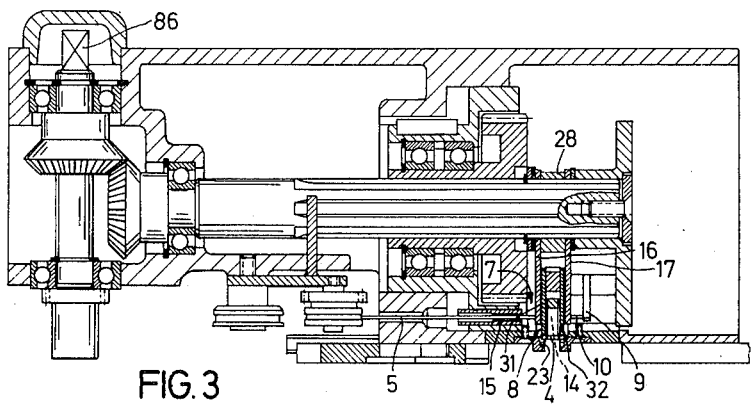
FIG. 3 is a sectional view taken along the line III—III of FIG. 1.

Ejector plates 31 and 32 are secured to the opposite sides of arm 30 of ejector 27 and, as shown in FIG. 3, the two plates 31 and 32 are spaced from each other at a distance corresponding to the distance of the clamp legs against which the free ends of plates 31, 32 are engageable.

Figure 1:
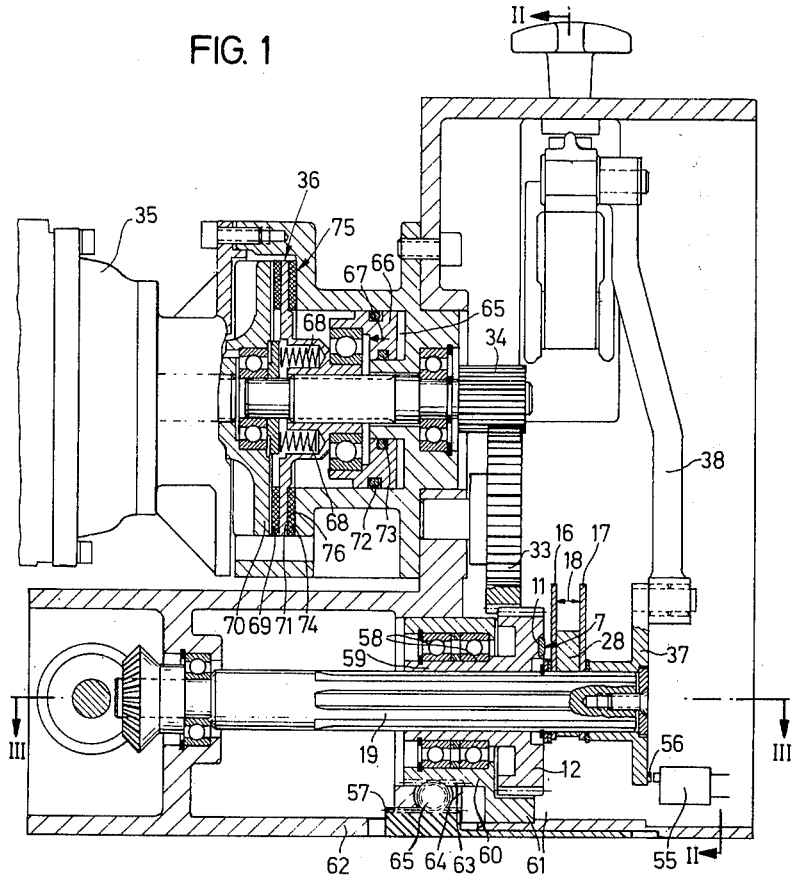
FIG. 1 is a vertical sectional view of the inventive device.

As shown in FIG. 1, splined shaft 19 drives not only the cam 28 and the two bending tools 16 and 17, but also the cutting tool 11. As already mentioned, the cutting knife is secured to drive gear 12 so as to be displaceable and adjustable in its longitudinal direction. Gear 12 is driven by an intermediate gear 33 meshing with a drive pinion 34. Pinion 34 is intermittently driven by an electric motor 35, through a clutch 36. After being started, motor 35 runs continuously at a predetermined speed. It drives not only the cutting device 7, bending device 8, and ejecting device 20 but also the clamp closing device 21, 22. For this purpose, a crank 37 is mounted on the free end of splined shaft 19, effecting, through a link 38, oscillatory movement of a swing lever 39 in the direction of double arrow 40. By means of a slideway 41 provided in swing arm 39, as well as of a sliding block 42 reciprocable therein, a reciprocating up and down movement of driver 21 is obtained. The upper end of driver 21 is firmly connected to a supporting member 43 which is mounted for slidable up and down movement on a guide bar 44 and to which sliding block 42 is pivoted. It would also be possible to provide a swing lever and an associated sliding block at each side of supporting member 43. The force exerted upon clamp 4 can advantageously be varied by displacing pivot 45 of swing lever 39 or a plate 46 carrying the pivot in the direction of double arrow 47. Prior to that, fixing screws 48 which, in FIG. 2, are only indicated in dotted lines, must be loosened, of course. The displacement is effected by means of a rotary adjusting handle 49 provided with a threaded bolt 51 rotatable without axial displacement and engaged into an internal thread of an extension 50 of plate 46. After the adjustment, screws 48 are tightened again.

Considered in the working direction of rotation 52 (FIG. 2), the bending faces or edges, i.e., the undersides of bending tools 16, 17, are positioned in advance of the free end 53 of cam 28 while the cutting edge 54 of cutting tool 11 is positioned in advance of the faces or edges of the bending tools. Thus, in accordance with the operational sequence, first the material 5, for example, the wire, is cut off, then the clamp legs are bent down, and finally, cam 28 pushes the finished clamp out into guide 23. For this, in the present example, a relatively small angle of less than 90° is sufficient, as shown in FIG. 2. The remaining angle of rotation of drive gear 12 is used for other purposes, particularly for the closing of the clamp. As will be explained hereinafter, drive gear 12 executes always only a single revolution and a new impulse is necessary to start it again. The same applies to the elements operationally preceding and following gear 12. The intermittent stopping of the drive is effected by means of a switch 55 cooperating, particularly in a contactless manner, with a switching element 56 provided on crank 37. There is no difficulty, however, in providing the switch means at another location.

Cutting tool 11 and limit stop 9 for the free end of lockable material 10 are displaceable relative to each other and lockable in position. For this purpose, limit stop 9 is connected to a slider 57 or is formed integrally therewith, while cutting tool 11, or drive gear 12 serving also as a support of the tool, is displaceable in both directions on splined shaft 19. Through bearings 58, hub 59 of drive gear 12 is coupled to a displaceable but non-rotatable sleeve 60. A rotation preventing lock 61 against rotation is formed by an extension of sleeve 60 and a groove of housing 62 into which the extension engages while remaining longitudinally displaceable. As shown in FIG. 1, sleeve 60 is provided, on its underside, with a gear rack 63, while slider 57 is provided with a gear rack 64 on its upper side. An adjusting pinion 65 meshes simultaneously with both of the racks. By turning pinion 65 in one direction, the distance between cutting tool 11 and limit stop 9 increases while a turning in the opposite direction causes these elements to approach each other.

Clutch 36 is pneumatically actuable and is controllable from the filling machine (not shown) which comprises filling tube 2. During the filling operation, for example, forming of a sausage, clutch 36 is open, i.e., disengaged. With or upon the stoppage of the filling pump, an electropneumatic valve is actuated through which compressed air is supplied into chamber 65 (FIG. 1). Thereby, piston 66 is displaced in the direction of arrow 67, against the action of return springs 68. In consequence, clutch lining 69 of clutch disc 71 engages clutch disc 70 which, with the motor 35 energized, rotates continuously. This puts into motion all members of the drive connected to clutch disc 71 until, after one revolution of crank 37, switch 55 causes a new disengagement of the clutch. The disengagement is obtained, for example, by the clearing of a vent communicating with chamber 65. During the venting of chamber 65, pistion 66, which is sealed at the inner and outer walls of its cylinder by two O-rings 72 and 73, moves in the direction opposite to arrow 67, from the left to the right-hand side, under the action of return springs 68. At the end of this return motion, brake lining 74 of a brake 75 comes into contact with an opposite braking area 76 so that the drive is stopped relatively quickly. On the other hand, the continuously rotating clutch disc 70 ensures a starting of the drive with almost no appreciable time delay. Brake 75 and switching arrangement 55, 56 are designed and disposed so that the drive is stopped upon the complete closing of clamp 4 but prior to the following cutting of material 5.

As already explained, the stroke of ram 77, cooperating at its free end with deflection member 22 which is designed as a bottom die, is adjustable. At the same time, both ram 77 and member 22 are replaceable in order to permit the use of other clamps. If necessary, the driven control member 78 along with other elements of the clamp closing device 21, 22 and perhaps even the respective driving mechanism may also be made replaceable. The same applies to clamp guide 23.

As shown in FIG. 4, the feed mechanism 6 for clamp material 5 comprises a rope pulley 79, at least one holding or straightening roll 80 as well as at least one pair of driving rollers 81, 82. An intermediate roller 83' is mounted between rope pulley 79 and the transport rollers. The clamp material 5, for example wire, is passed once or twice around rope pulley 79.

A supporting arm 83 of the inventive device is connected to a bearing sleeve 84. Sleeve 84 is mounted for rotation on a vertical column 85. Thus, the entire device can be pivoted perpendicularly to the drawing plane of FIG. 4. The design is such that two inventive devices can be mounted in adjacent position on one and the same column 85, the devices being designed preferably symmetrically relative to each other. They may be mounted on column 85 either by means of a common bearing sleeve 84 or by means of two bearing sleeves mounted one above the other. In such a case, the supporting arms 83 have to be designed correspondingly. In any case, it must be ensured that, by means of such a twin device, two clamps 4 can be engaged closely adjacent each other, for which purpose the two control members 78 of the two devices must face each other. It is easily possible to make the distance between the two closing devices adjustable by moving the two halves of the twin device laterally apart or by pivoting them slightly apart. The clamps may also be manufactured, pushed out and closed upon manual actuation. To this end, a removable hand crank or the like may be fitted on a polyhedral journal 86.

While a specific embodiment of the invention has been shown and described in detail to illustrate the application of the principles of the invention, it will be understood that the invention may be embodied otherwise without departing from such principles.

What is claimed is:

1. In a device for closing elastic packages, particularly tubular casings, by means of clamping ties, of the type including a cutting device, feeding means operable to feed a substantially continuous length of clamping tie material intermittently to the cutting device for severing into individual clamping ties, a bending device operable to bend each individual clamping tie into an inverted substantially U-shaped including a pair of spaced legs, a clamping tie closing device operable to wrap each bent clamping tie around the tubular casing to be closed, and means operable to feed bent clamping ties from the bending device to the closing device: the improvement in which said cutting device includes a limit stop for the free end of the clamping tie material fed thereto by said feeding means and further includes a cutting tool spaced from said limit stop by a spacing corresponding to the length of the clamping tie to be cut; said cutting tool and said limit stop being mounted for adjustment and displacement relative to each other.

2. A device for closing elastic packages, as claimed in claim 1, including a slide member supporting said limit stop; a drive shaft; a rotary member mounted on said drive shaft for rotation therewith and for relative axial displacement therealong; said cutting tool being supported by said rotary member; said slide member and said rotary member having respective gear racks which face each other and extend parallel to each other; and an adjusting pinion meshing with said racks for conjoint adjustment of said slide member and said rotary member.

3. In a device for closing elastic packages, particularly tubular casings, by means of clamping ties, of the type including a cutting device, feeding means operable to feed a substantially continuous length of clamping tie material intermittently to the cutting device for serving into individual clamping ties, a bending device operable to bend each individual clamping tie into an inverted substantially U-shape including a pair of spaced legs, a clamping tie closing device operable to wrap each bent clamping tie around the tubular casing to be closed, and means operable to feed bent clamping ties from the bending device to the closing device: the improvement in which said cutting device includes a limit stop for the free end of the clamping tie material fed thereto by said feeding means and further includes a cutting tool spaced from said limit stop by a spacing corresponding to the length of the clamping tie to be cut; said cutting tool being a rotating cutting tool; a tubular guide through which the clamping tie material is fed by said feeding means; an anvil supporting the free end of the clamping tie material; said anvil and said guide being positioned on opposite sides of the point of severing of the clamping tie material by said cutting device; said anvil forming part of said bending device and having a supporting surface whose length and shape correspond approximately to the length and shape of the mid portion of the bent clamping tie; said bending device including a pair of bending tools, for bending the clamping tie legs, movable past opposite ends of said anvil to bend each individual clamping tie; said bending tool comprising rotatably mounted bending levers extending parallel to each other and spaced from each other by a distance corresponding approximately to the overall span of the legs of the bent clamping tie; said means operable to feed bent clamping ties from said bending device to said closing device comprising a clamping tie guide; an ejection device operable to eject bent clamping ties from bending device into said clamping tie guide; said ejection device comprising a pivotally mounted ejector; and a cam operable to swing said ejector in opposit-e directions.

4. A device for closing elastic packages, as claimed in claim 3, including a drive shaft; said bending levers being mounted on said drive shaft for rotation therewith; said cam being mounted on said drive shaft between said bending levers.

5. A device for closing elastic packages, as claimed in claim 4, in which said cutting tool is mounted on said drive shaft for rotation therewith; the working edges of said bending tools, considered in the working direction of rotation of said drive shaft, being positioned angularly in advance of the operative end of said cam engageable with said ejector, and the cutting edge of said cutting tool being positioned angularly in advance of the working edges of said bending tools.

6. A device for closing elastic packages, as claimed in claim 5, including at least one spacer positioned between said cam and each of said bending tools.

7. In a device for closing elastic packages, particularly tubular casings, by means of clamping ties, of the type including a cutting device, feeding means operable to feed a substantially continuous length of clamping tie material intermittently to the cutting device for severing into individual clamping ties, a bending device operable to bend each individual clamping tie into an inverted substantially U-shape including a pair of spaced legs, a clamping tie closing device operable to wrap each bent clamping tie around the tubular casing to be closed, and means operable to feed bent clamping ties from the bending device to the closing device: the improvement in which said cutting device includes a limit stop for the free end of the clamping tie material fed thereto by said feeding means and further includes a cutting tool spaced from said limit stop by a spacing corresponding to the length of the clamping tie to be cut; an electric motor operating as a common drive for said cutting device, said bending device and an ejection device operable to eject a bent clamping tie from said bending device for delivery to said clamping tie closing device; said motor being in driving relation with said clamping tie closing device; and a controllable clutch connecting said electric motor to driving mechanisms for said cutting device, said bending device, said clamping tie closing device and said ejection device.

8. A device for closing elastic packages, as claimed in claim 7, in which the elastic packages are tubular casings filled by a sausage machine operatively associated with said device; said clutch being closed to connect said electric motor to said driving mechanisms during stopping of the sausage machine.

9. A device for closing elastic packages, as claimed in claim 8, in which said clutch is closed by operation of a first switch means actuable by the sausage machine to engage said clutch; and a second switch means actuable by a drive shaft, connecting said electric motor to said cutting device and said bending device, said second switch means being operable, when actuated, to effect disengagement of said clutch.

10. A device for closing elastic packages, as claimed in claim 9, including a control element secured to rotate with said drive shaft; said second switch means being actuable by said control element to disengage said clutch following closing of the clamping tie by said clamping tie closing device and in advance of the subsequent actuation of said cutting device.

11. A device for closing elastic packages, as claimed in claim 10, in which said clamping tie closing device includes a bottom die and a ram reciprocable toward and away from said bottom die to effect closing of the clamping tie in cooperation with said bottom die; the stroke of said ram being adjustable.

12. A device for closing elastic packages, as claimed in claim 11, including means operable to actuate said ram manually.

* * * * *